UNITED STATES PATENT OFFICE.

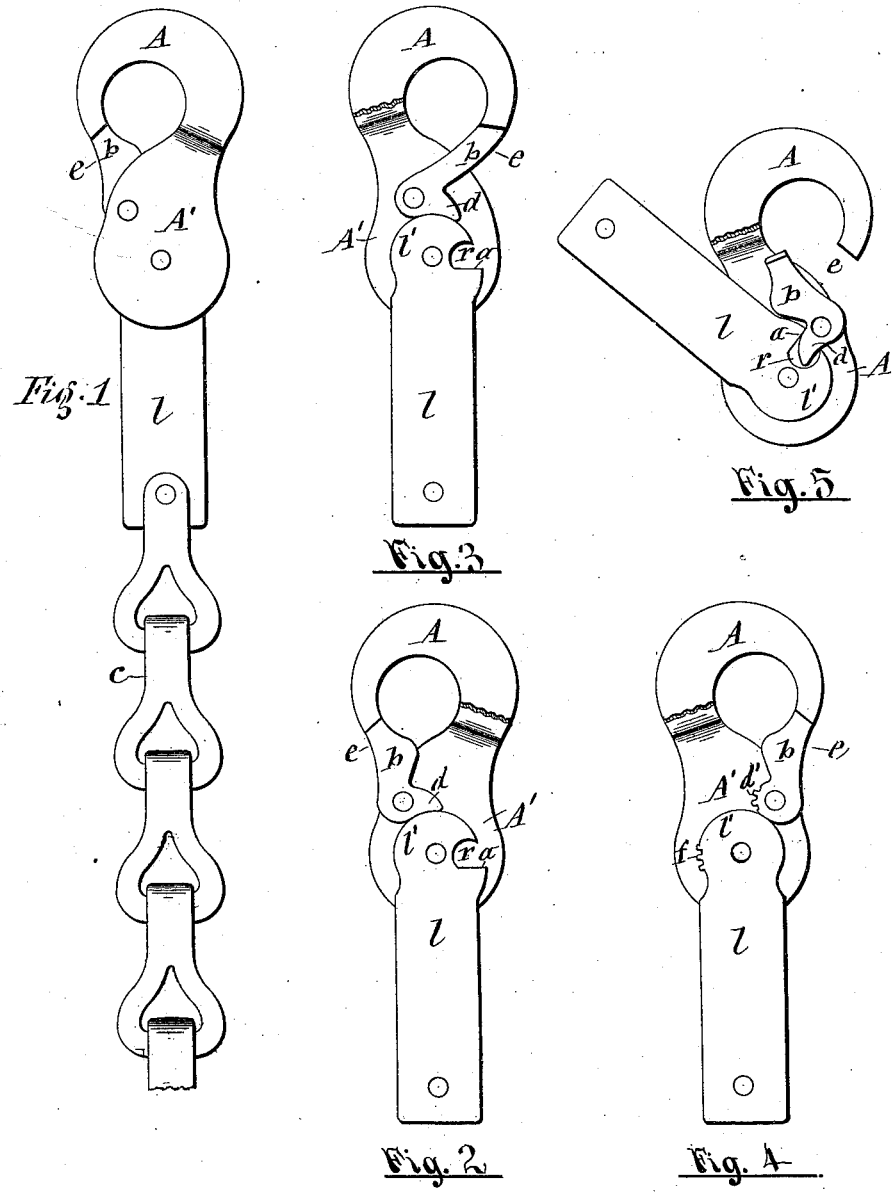

JOHN F. SEARS, OF CLIFTON, ONTARIO, CANADA, AND HARRY E. KELLEY, OF NIAGARA FALLS, NEW YORK, ASSIGNORS TO THE ONEIDA COMMUNITY, (LIMITED,) OF COMMUNITY, NEW YORK.

SNAP-HOOK.

SPECIFICATION forming part of Letters Patent No. 375,571, dated December 27, 1887.

Application filed July 11, 1887. Serial No. 214,029. (No model.)

*To all whom it may concern:*

Be it known that we, JOHN F. SEARS, of Clifton, in the Province of Ontario and Dominion of Canada, and HARRY E. KELLEY, of Niagara Falls, in the county of Niagara, in the State of New York, have invented new and useful Improvements in Snap-Hooks, of which the following, taken in connection with the accompanying drawings, is a full, clear, and exact description.

This invention consists in a novel construction of a lock snap-hook having a stout and durable gate or latch adapted to open and close the entrance to the hook, and a positive lock for retaining the said gate or latch in its closed position, as hereinafter fully described, and specifically set forth in the claims.

In the annexed drawings, Figure 1 is a plan view of our improved lock snap-hook. Fig. 2 is a plan view of the same with a portion of one side thereof broken away to illustrate the construction and arrangement of the gate or latch and the positive lock. Figs. 3 and 4 illustrate modifications of our invention, and Fig. 5 shows the snap-hook in its open condition.

Similar letters of reference indicate corresponding parts.

A denotes the hook, formed with a suitable shank, A′, by which to attach it to the article on which it is to be used, and which, for exemplification, is here represented in the form of a tie-chain, c, of an animal-trap. To a suitable portion of the hook A, preferably to the shank A′ thereof, we pivot a gate or latch, b, in such a manner as to allow the same to swing into a position to lie across the entrance e to the hook and thus close the same, and to swing out of said closed position, as represented in Fig. 5 of the drawings. Said gate we form with a cam, d, projecting from the pivoted end thereof, and at a point in a line from the cam, directly toward the free end of the shank A′, we pivot on the latter a lever, l, which is formed with a segmental head, l′, concentric with the pivot and terminating with a recess, r, and with a shoulder, a, at the farther side of said recess. The edge of the segmental head l′ bears on the rear edge of the cam d, and thereby holds the gate b in its closed position across the entrance e to the hook A. By swinging the lever l on its pivot in a direction to carry the recess r toward the cam the shoulder a of the lever engages the end of the cam and draws the same into the recess r, and thus throws the gate out of the entrance e to open the same, so as to permit the hook to be entered into a ring or other suitable article. By swinging the lever l back in line with the shank A′ the segmental head l′ throws the cam d out of the recess r, and thereby swings the gate into its closed position across the entrance e, and retains it in said position by the pressure of the edge of the head l′ against the edge of the cam.

The gate b can be made to swing either inward, as shown in Fig. 2 of the drawings, or outward, as represented in Fig. 3 of the drawings, the direction of said movement depending simply on the position of the cam d, recess r, and shoulder a in relation to the pivots of the gate and lever.

Although we deem the described construction of parts as one of the simplest, cheapest, and most efficient for the purpose, yet we do not limit ourselves to the same specifically, inasmuch as the gate with its positive lock is susceptible of several modifications, one of which we illustrate in Fig. 4 of the drawings, in which the gate b has a segmental rack, d′, and the head l′ of the lever l has its segmental edge terminated with cogs f, adapted to mesh with the rack d′ when the lever is swung to one side on the shank A′. The engagement of the cogs f with the rack throws the gate into its open position.

Having described our invention, what we claim as new, and desire to secure by Letters Patent, is—

1. A lock snap-hook comprising a gate pivoted to swing to and from the entrance to the hook, and a lever pivoted on the shank of the hook and engaging the gate to move the same to its open and closed positions automatically with the turning of the lever on its pivot, as set forth.

2. In a lock snap-hook, the combination of a gate pivoted to swing to and from the entrance to the hook, a cam projecting from said gate, and a lever provided with a shoulder adapted to engage the aforesaid cam during the movement of the lever, as set forth.

3. In a lock snap-hook, the combination of a gate pivoted to the shank of the hook and adapted to open and close the entrance to the hook, a cam projecting from the pivoted end of the gate, and a lever pivoted on the aforesaid shank and formed with a segmental head bearing on the cam of the gate and terminating with a recess adapted to receive the end of the cam, substantially as described and shown.

JOHN F. SEARS.
HARRY E. KELLEY.

Witnesses:
FRANK A. DUDLEY,
F. H. KRULL.